MICROWAVE SWITCH UTILIZING WAVEGUIDE FILTER HAVING CAPACITANCE DIODE MEANS FOR DETUNING FILTER

Filed Jan. 31, 1962

2 Sheets-Sheet 1

INVENTORS:
KENNETH P. RAY,
PETER GEORGIEV,
BY I. David Blumenfeld
THEIR ATTORNEY.

INVENTOR:
KENNETH P. RAY,
PETER GEORGIEV,
BY J. David Blumenfeld
THEIR ATTORNEY.

3,164,792

MICROWAVE SWITCH UTILIZING WAVEGUIDE FILTER HAVING CAPACITANCE DIODE MEANS FOR DETUNING FILTER

Peter Georgiev, San Carlos, Calif., and Kenneth P. Ray, Lynchburg, Va., assignors to General Electric Company, a corporation of New York Filed Jan. 31, 1962, Ser. No. 170,026
2 Claims. (Cl. 333—73)

This invention relates to an apparatus for controlling the propagation of electromagnetic energy and, more particularly, to an apparatus for electrically controlling the transmission of a microwave signal in a waveguide.

There are a number of microwave switching techniques for controlling the propagation of energy along a waveguide or other transmission medium. One class of microwave switches utilizes gaseous discharge devices to control propagation. The gaseous discharge device is positioned in a waveguide or resonant cavity and the conductivity of the gas is controlled to produce a switching action by short circuiting the incident energy when the gas is ionized. Such gaseous switches, however, have certain undesirable characteristics which limit their utility. Specifically, since a gaseous ionization process is involved, the switching speed and the switching repetition rate are obviously limited by the ionization and deionization times of the gas. Furthermore, the ionization of the gas which controls the switching phenomenon does not take place instantaneously, and devices of this type therefore pass a short but intense "spike" of power at the start of the switching operation.

Mechanical switching elements have also been utilized to control the propagation of the electromagnetic energy along a waveguide. Mechanical devices, however, leave much to be desired from the standpoint of size, speed, and simplicity as they are bulky, complex and slow in operation.

In an attempt to avoid these various problems, solid state devices such as crystal diodes have been proposed to perform this switching function. In systems of this type, the diode is located in a waveguide and is forward biased whenever transmission of the electromagnetic energy down the waveguide is to be prevented. With the forward bias applied to the diode, the diode is driven into conduction and presents a low impedance or short circuit across the waveguide. The impinging microwave signal is thus prevented from propagating along the guide and is substantially dissipated across the low impedance diode. While a switch of this type represents a definite improvement over a mechanical or gaseous switch in that the diode switch is small, may be electrically controlled, and is fairly rapid, the described switch also has serious limitations which restrict its usefulness. Its major shortcoming resides in the fact that diode switches have very limited power handling capacities since the diode switch must dissipate all of the impinging energy. The amount of power which can be switched by a diode is limited to a fraction of a watt, since any increase beyond this level causes the diode to dissipate so much energy that the diode is destroyed.

It is therefore one of the primary objects of this invention to provide a switching arrangement for microwave energy employing a semiconducting diode wherein large amounts of power can be handled without destruction of the switching element.

A further object of this invention is to provide a microwave switching arrangement wherein large amounts of microwave power may be switched without destroying or deleteriously effecting the switching arrangement.

Fundamentally, such switching of large amounts of microwave power by means of a diode device may be achieved with a diode of the type where an electrical change in its reactance characteristics is utilized rather than its change of conductivity. By varying the reactance rather than the conductivity of the diode element, very little energy is dissipated by the diode switching device itself, and much larger amounts of power can be switched without deleteriously affecting the diode.

It is therefore yet another object of this invention to provide a microwave switching arrangement utilizing a novel electrically de-tunable resonant circuit arrangement.

Other objects and advantages of the invention will become apparent as the description thereof proceeds.

The various advantages of the invention may be achieved in one form of the invention by providing a waveguide along which electromagnetic energy is propagated. A filter arrangement which is tuned to the frequency of the impinging electromagnetic radiation is positioned in the guide. The filter arrangement includes a diode which is normally biased slightly in the forward direction. In this condition energy is transmitted through the filter with minimum loss and dissipation of energy in the diode. To switch the energy, the diode is reverse biased so that its reactance is varied. This reactance variation de-tunes the filter sufficiently so that substantially all of the impinging electromagnetic energy is reflected by the filter. A simple, effective switching mechanism is thus provided which is capable of handling much larger amounts of power than previously possible.

The novel features which are characteristic of this invention are set forth with particularity in the appended claims. The invention itself, however, both as to its organization and method of operation, together with other objects and advantages thereof, may best be understood by reference to the following description taken in connection with the accompanying drawings in which:

Figure 1:
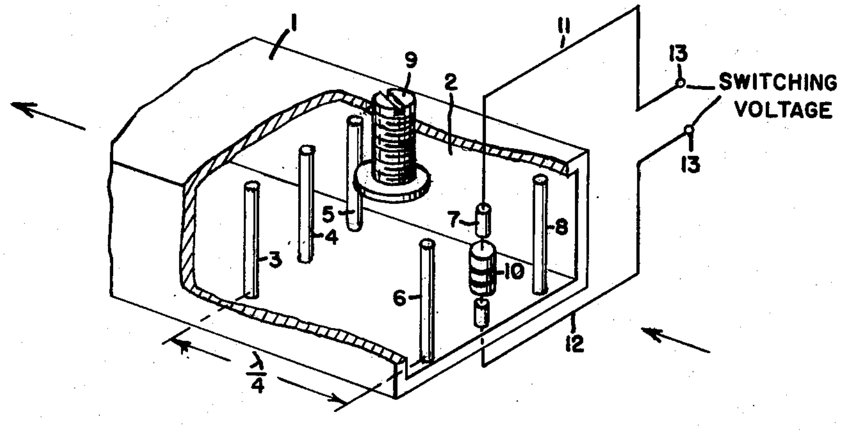
FIG. 1 is a partial perspective of the novel switching arrangement of the invention.

FIG. 1 illustrates, in perspective, one embodiment of a switching arrangement for controlling the propagation of electromagnetic energy down a transmission medium. Microwave energy from a source, not shown, is, for example, propagated from right to left along waveguide 1 to a suitable utilization circuit, also not shown. Positioned in the waveguide is a filter arrangement 2 which, as will be explained in detail later, forms a portion of the novel switching arrangement of the invention. The filter 2 comprises a shunt resonant circuit which is normally tuned to the frequency of the energy being transmitted along the wave guide. The transmitted energy, therefore, passes through filter 2 with substantially no losses.

The filter consists of distributed and lumped shunt inductances and capacitances. The shut inductance is in the form of a first set of cylindrical posts 3, 4, and 5 equally spaced across the width of the waveguide and parallel to the electric field vector and a second set of similar posts 6, 7 and 8 positioned slightly less than an integral number of half wave lengths away. The shunt capacitance is the distributed capacitance between the upper and lower wall of waveguide 1 and the lumped capacitance represented by the variable tuning screw 9. The resonant frequency or passband of filter 2 is initially established by the inductive posts and variable tuning screw 9 and is then electrically de-tuned to perform the desired switching function and control propagation of energy along the waveguide. To this end, an electrically controlled, variable reactance device is incorporated in the filter structure to de-tune the filter in response to applied switching signals. One of the inductive posts, in this instance post 7, is modified to incorporate a two-terminal device the reactance characteristics of which may be electrically varied. A portion of post 7 is removed and replaced by a semiconductor diode element 10. Leads 11 and 12 extend through post 7 to diode 10 and thence through the upper and lower walls of the waveguide to a pair of input terminals 13–13 which have a switching voltage of the proper polarity impressed thereon to control the reactance of the diode and thereby the resonant frequency of the filter.

Semiconductor diode element 10, which may be a germanium diode, is characterized by the fact that its reactance may be varied by varying the polarity of the applied biasing voltage to the diode. Preferably the applied biasing voltage switches the diode from a slightly forward biased conducting condition to a reverse biased or nonconducting condition, although as will be pointed out subsequently, a change in the capacitance of the diode element may be achieved without actually changing the direction of conduction. A point contact diode element such as a germanium diode is essentially a capacitance in shunt with a nonlinear resistance. With the diode biased in the forward or conducting direction the resistance of the diode varies as a function of the voltage and the capacitance remains substantially constant. If, however, the biasing voltage is changed to reverse bias the diode into the nonconducting condition, the shunt capacitance varies with the applied voltage producing a change in reactance which detunes filter 2.

In operation the diode is normally slightly forward biased into conduction causing the R-F impedance of the diode to appear approximately as that of the original post. The resonant frequency of filter 2 is thus set at the frequency of the transmitted signal and the signal therefore passes through the filter with substantially no losses. Whenever it is desired to switch the microwave signal in order to prevent propagation along the waveguide to the load, diode 10 is reverse biased causing it to become nonconducting. The reverse biasing also results in a change in the capacitance of the diode. Such a capacitance variation de-tunes the filter which is thus no longer resonant at the signal frequency and substantially all of the incident energy is reflected back in the direction of the source. Substantial isolation between the input and output of the filter is thereby achieved.

Figure 2:
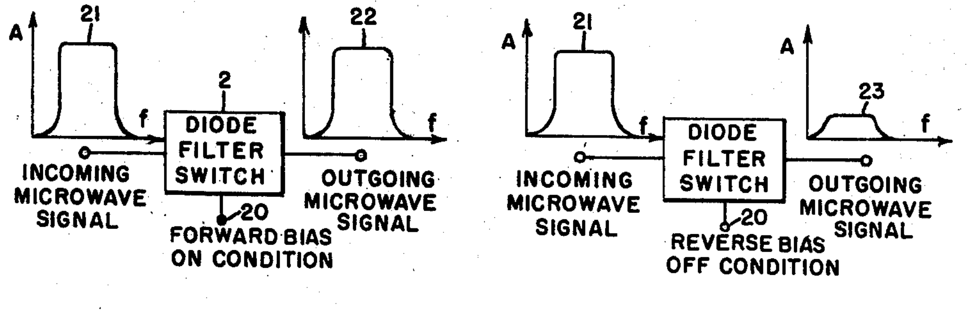
FIG. 2 is a graphical representation of the operating characteristics of the switching arrangement of FIG. 1.

As may be seen more easily in FIG. 2 with the diode filter switch 2 in the "on" condition, by the application of a forward bias to the control terminal 20, an incident signal with a frequency bandwidth 21 passes through the filter switch essentially without any attenuation, and the output of the filter is a corresponding signal 22 having essentially the same amplitude as the input signal. In this instance, the bandwidth of the filter is made wider than the bandwidth of the signal. However, with the application of reverse bias to the control terminal 20, substantially all of the incident signal 21 is reflected and the output signal 23 is reduced by 30 db or so.

As was pointed out above, switching is achieved by incorporating an electrically variable solid state reactance device in the filter. In the discussion above, a point contact germanium diode was described as one type of solid state device which may be used for this purpose. It will be appreciated, however, that other solid state semiconductor devices may be used for the same purpose. For example, variable capacitance junction diodes of the type customarily referred to as "varactors" may also be used. Varactors are voltage sensitive two terminal variable capacitance semiconductor devices which consist of a zero or reverse bias p-n junction. With zero or reverse biasing, a narrow region exists at the junction of the p and n type conductivity materials which is free of all mobile charge carriers. This charge free region, which is usually referred to as the "depletion" layer, is bounded on either side by the p and n conductivity materials. In other words, a "varactor" includes a "dielectric" region bounded by two semiconducting regions which, by definition, is a capacitance. The width of the "depletion" layer at the junction, and hence the capacitance, may be controlled by varying the voltage across the diode. A minimum value of capacitance is obtained at maximum reverse bias. As the reverse biasing is reduced towards zero the capacitance increases, and in fact, continues to increase with a slight amount of biasing in the forward conduction region. Thus, a "varactor" type of diode may also be used in connection with filter structure 2 to produce the desired switching of the energy.

Figure 3:
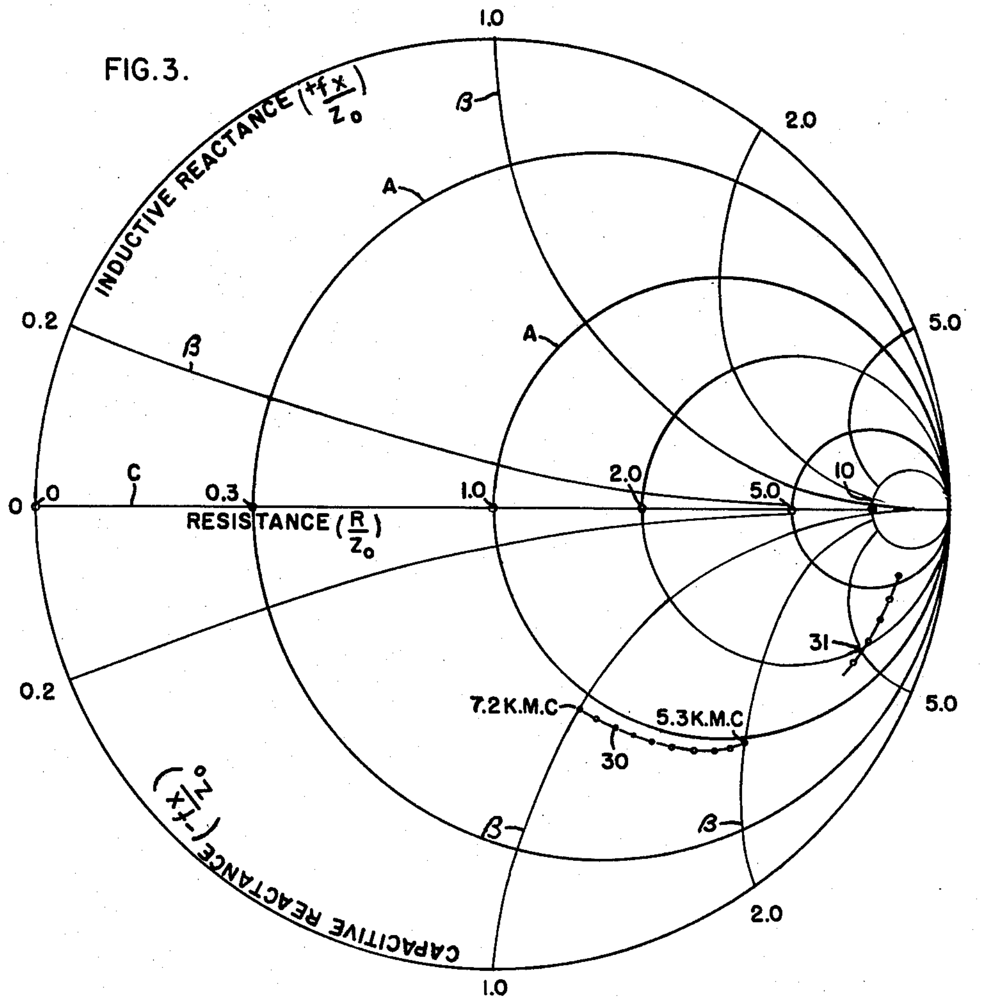
FIG. 3 is a graphical illustration in the form commonly referred to as a "Smith Chart" illustrating the operating impedance (admittance) characteristics of the invention.

To illustrate the various features of the invention and particularly the reactance characteristics of a semiconducting diode element, a series of test were conducted to illustrate changes in the resistance and reactance of the diode with forward and reverse biasing. To this end, a point contact germanium diode of the type sold by the Ohmite Manufacturing Corporation of Skokie, Illinois, under their trade designation "OMC-1160" was incorporated in a filter structure of the type illustrated in FIG. 1. Biasing voltage was impressed on the diode and selectively switched between a very small degree of forward biasing, in the order of $\frac{5}{10}$ of a volt producing a forward current of 50 milliamperes, and a reverse bias of −40 volts. The resistance and capacitance characteristics of the diode were then measured with a microwave signal in the frequency range from 5.8 to 7.2 kmc. impressed on the switching apparatus. The resulting measurements were plotted on the circular normalized admittance chart illustrated in FIG. 3, a chart usually referred to as a "Smith Chart" or circle diagram. The "Smith Chart" illustrated in FIG. 3 comprises constant resistance circles "A" representing the normalized resistive component of the diode $$\left(\frac{R}{Z_0}\right)$$

and constant reactance curves "B" consisting of the normalized capacitive reactance $$\left(\frac{-jx}{Z_0}\right)$$

to the left of diameter "C" and the normalized inductive reactance component $$\left(\frac{+jx}{Z_0}\right)$$

to the right of diameter "C." With a slight forward biasing voltage applied to the diode, the resistive and capacitive characteristics of the diode are illustrated by the curve 30 for frequencies varying from 5.8 kmc. to 7.2 kmc. As may be seen from curve 30 the resistive component of the diode remains substantially constant with frequency. However, the reactance of the diode varies somewhat with signal frequency. This frequency sensitivity of the diode may be explained by the fact that the leading capacitance and other capacitive effect of the termination units, leads, of the diode vary with frequency.

Curve 31 illustrates the resistive and reactive characteristics of the diode with the diode biased in the reverse direction, and as may be seen very clearly, both the reactance and the resistance of the device changes substantially for corresponding frequencies. The change of resistance may be understood quite easily since the diode has been switched from the conducting to the nonconducting state thereby producing substantial increase in its resistance. The capacitance of the diode also changes substantially with reverse biasing. For example, at 7.2 kmc., the reactive capacitance of the diode changes from the 1.0 curve in the forward conductivity region to the 4.0 curve. It will thus be apparent that with changes in the biasing voltage the capacitance of the diode, and hence the resonant frequency of the filter incorporating such a diode changes substantially from the forward conducting region to the reverse or nonconducting region.

Figure 4:
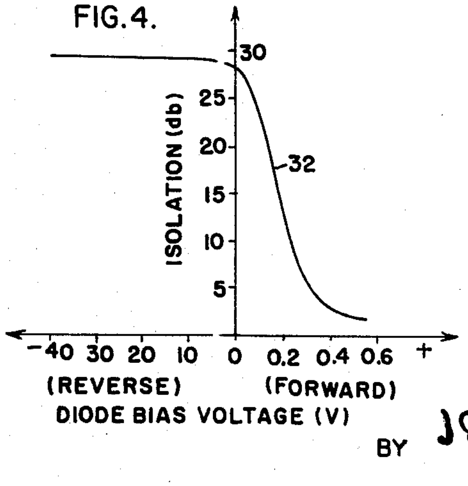

The effectiveness of the switch in terms of the isolation afforded by the filter arrangement may be seen most clearly with reference to FIG. 4 wherein the isolation between the input and output of the filter switch is plotted along the ordinate in db and the applied biasing voltage in the forward and reverse directions along the abscissa. With a slight forward conduction voltage on the order of $\frac{5}{10}$ of a volt, there is very little isolation and all of the energy passes substantially through the filter with a loss of only approximately 1½ db. As the forward conduction bias voltage is reduced towards zero, the amount of isolation increases. This is so because the capacitance of the diode also varies with a slight forward biasing. As the biasing voltage goes to zero and is increased in the reverse direction, the isolation effect produced by the filter-switch arrangement becomes more pronounced, and with a reverse biasing voltage of approximately 40 volts, an isolation of approximately 25–30 db is achieved. The operating parameters for the test carried out and illustrated by curve 32 were as follows: the frequency of the impinging microwave energy was 6.7 mc., the diode was a point contact germanium diode of the type manufactured by the Ohmite Manufacturing Corporation and sold under their trade designation "OMC–1157," and the biasing voltage was varied in a step-wise fashion approximately .55 volt in the forward direction to −40 volts in the reverse direction. It will be appreciated from this curve that by switching the biasing voltage discretely between the forward biasing condition and the reverse biasing condition of −40 volts, a very sharp and very pronounced switching effect is produced which results in isolation of the order of 30 db.

It will be apparent, of course, that a plurality of such filter sections, each containing a switching diode, may be positioned along the waveguide to enhance the amount of isolation which may be achieved.

While particular embodiments of this invention have been shown and described above, it will, of course, be understood that it is not limited thereto since many modifications both in the circuit arrangement and in the instrumentalities employed may be made. It is contemplated by the appended claims to cover any such modifications which fall within the true spirit and scope of this invention.

What is claimed as new and desired to be secured by Letters Patent is:

1. In a microwave switch for controlling the transmission of microwave energy along a waveguide, the combination comprising, (*a*) a filter structure positioned in said waveguide and including a plurality of inductive post elements, said filter having a desired passband for transmitting microwave energy substantially without attenuation, (*b*) a diode element incorporated in one of the posts forming said filter, said diode having a resistive and a reactive state, (*c*) biasing means coupled to said diode element for selectively forward and reverse biasing said diode to place it in said resistive and reactive states respectively whereby said filter is detuned when said diode is in the reactive state and the microwave energy is reflected thereby preventing further transmission along said waveguide and has the desired passband when said diode is in the resistive state.

2. In a microwave switching system the combination comprising, (*a*) a waveguide along which microwave energy is propagated, (*b*) a filter structure positioned in said waveguide and having a passband for transmitting said energy substantially without attenuation, said filter structure including, (1) a plurality of post elements positioned across said waveguide, (2) a further plurality of post elements positioned across said waveguide and located along said waveguide away from said first named plurality, (*c*) a diode element incorporated in one of the post elements, said diode having a resistive and reactive state, and (*d*) biasing means coupled to said diode for selectively forward and reverse biasing said diode to place it in said resistive and reactive states respectively whereby said filter is detuned when said diode is in the reactive state reflecting said microwave energy and preventing further transmission along said waveguide and said filter has the desired passband when said diode is in the resistive state.

References Cited by the Examiner

UNITED STATES PATENTS

| | | | |
|---|---|---|---|
| 2,510,288 | 6/50 | Lewis | 333—73 |
| 2,531,447 | 11/50 | Lewis | 333—73 X |
| 2,629,015 | 2/53 | Reed | 333—73 |
| 2,649,576 | 8/53 | Lewis | 333—73 |
| 2,752,495 | 6/56 | Kroger | 333—83 X |
| 2,858,513 | 10/58 | Lewis | 333—73 |
| 2,906,974 | 9/59 | Reggia | 333—81 X |
| 2,908,813 | 10/59 | Morrison | 333—13 X |
| 2,908,878 | 10/59 | Sullivan | 333—83 X |
| 2,914,671 | 11/59 | De Lange | 333—11 X |

HERMAN KARL SAALBACH, *Primary Examiner.*